United States Patent
Shin et al.

(10) Patent No.: US 7,839,463 B2
(45) Date of Patent: Nov. 23, 2010

(54) THIN FILM DIODE PANEL AND MANUFACTURING METHOD OF THE SAME

(75) Inventors: Kyoung-Ju Shin, Yongin-si (KR); Chong-Chul Chai, Seoul (KR); Joon-Hak Oh, Seoul (KR); Jin-Hong Kim, Seoul (KR); Sung-Jin Hong, Seoul (KR)

(73) Assignee: Samsung Electronics Co., Ltd. (KR)

( * ) Notice: Subject to any disclaimer, the term of this patent is extended or adjusted under 35 U.S.C. 154(b) by 489 days.

(21) Appl. No.: 10/578,028

(22) PCT Filed: Oct. 28, 2004

(86) PCT No.: PCT/KR2004/002742
§ 371 (c)(1),
(2), (4) Date: Apr. 27, 2006

(87) PCT Pub. No.: WO2005/040905
PCT Pub. Date: May 6, 2005

(65) Prior Publication Data
US 2007/0040956 A1    Feb. 22, 2007

(30) Foreign Application Priority Data
Oct. 29, 2003    (KR)    ...................... 10-2003-0075870

(51) Int. Cl.
*G02F 1/136*    (2006.01)
(52) U.S. Cl. ............................... 349/50; 349/49; 349/51
(58) Field of Classification Search .............. 349/49–52
See application file for complete search history.

(56) References Cited
U.S. PATENT DOCUMENTS
5,107,355 A * 4/1992 Satoh et al. .................. 349/147
(Continued)

FOREIGN PATENT DOCUMENTS
EP    0447077 A2    9/1991
(Continued)

*Primary Examiner*—David Nelms
*Assistant Examiner*—Thanh-Nhan P Nguyen
(74) *Attorney, Agent, or Firm*—Innovation Counsel LLP

(57) ABSTRACT

A thin film diode array panel comprising: an insulating substrate (110); first and second redundant gate lines (141, 142) made of an opaque conductor and formed on the insulating substrate; first and second floating electrodes (143, 144) made of an opaque conductor, formed on the insulating substrate, and disposed between the first and second redundant gate lines (141, 142); an insulating layer (151, 152) formed on the first and second floating electrodes (143, 144); a first gate line (121) formed on the first redundant gate line (141) and including a first input electrode (123) overlapping the first floating electrode (143) where the insulating layer (151) is interposed between the first input electrode and the first floating electrode; a second gate line (122) formed on the second redundant gate line (142) and including a second input electrode (124) overlapping the second floating electrode (144) where the insulating layer (152) is interposed between the second input electrode (124) and the second floating electrode (144); and a pixel electrode (190) including a first contact electrode (191) overlapping the first floating electrode (143) where the insulating layer (151) is interposed between the first contact electrode (191) and the first floating electrode (143), a second contact electrode (192) overlapping the second floating electrode (144) where the insulating layer (152) is interposed between the second contact electrode (192) and the second floating electrode (144), and a main body is provided.

14 Claims, 13 Drawing Sheets

U.S. PATENT DOCUMENTS

| | | |
|---|---|---|
| 5,539,549 A | 7/1996 | Kishida et al. |
| 5,893,621 A * | 4/1999 | Sekiguchi ..................... 349/51 |
| 5,909,264 A * | 6/1999 | Fujikawa et al. .............. 349/49 |
| 6,243,062 B1 * | 6/2001 | den Boer et al. ............. 345/91 |
| 6,593,991 B2 * | 7/2003 | Ishimoto ..................... 349/139 |
| 7,460,192 B2 * | 12/2008 | Oh et al. ........................ 349/50 |
| 2002/0145684 A1 * | 10/2002 | Watanabe et al. ............. 349/51 |

FOREIGN PATENT DOCUMENTS

| | | |
|---|---|---|
| EP | 0951008 A2 | 10/1999 |
| JP | 06-230435 | 8/1994 |
| JP | 09-258263 | 10/1997 |
| JP | 10-133235 | 5/1998 |
| JP | 10-142629 | 5/1998 |

* cited by examiner

[Fig. 1]
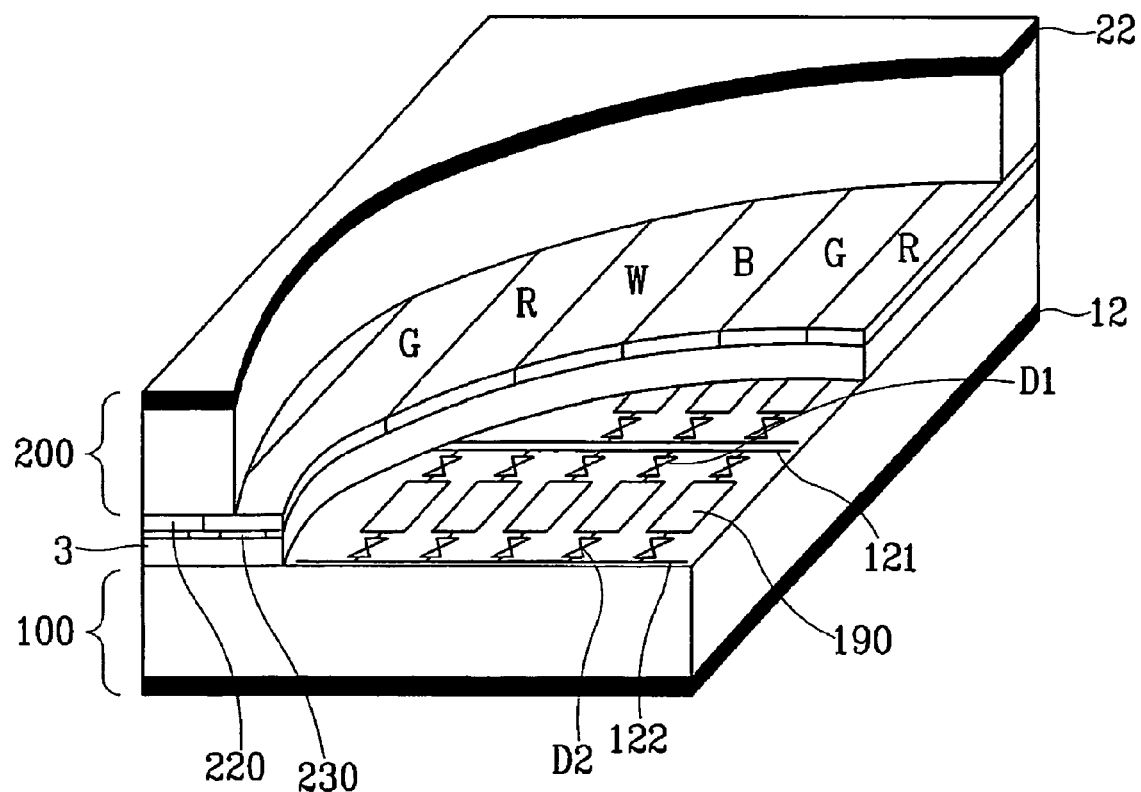

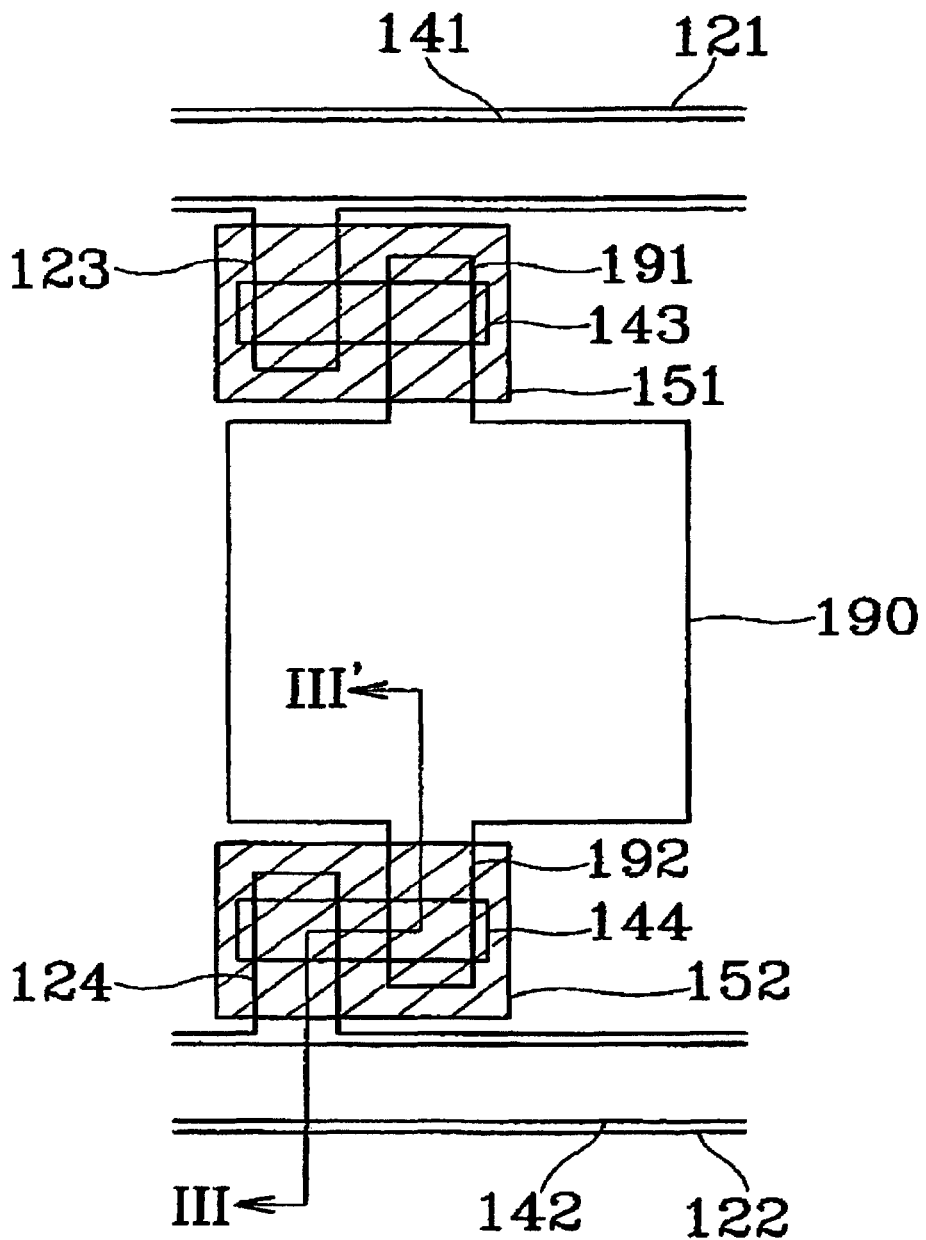
[Fig. 2]
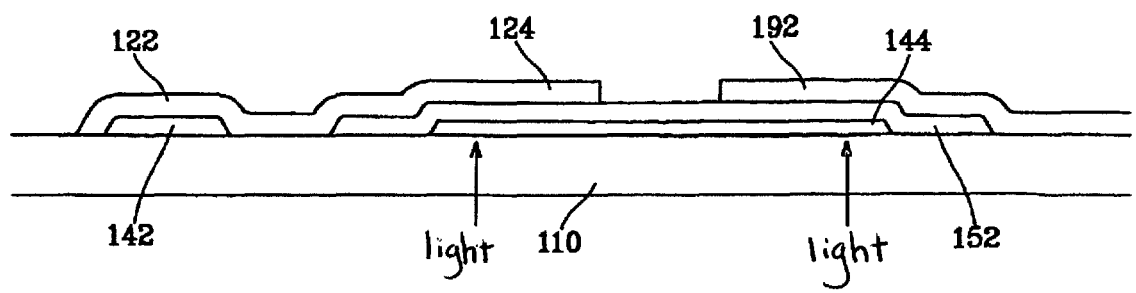
[Fig. 3]

[Fig. 4]
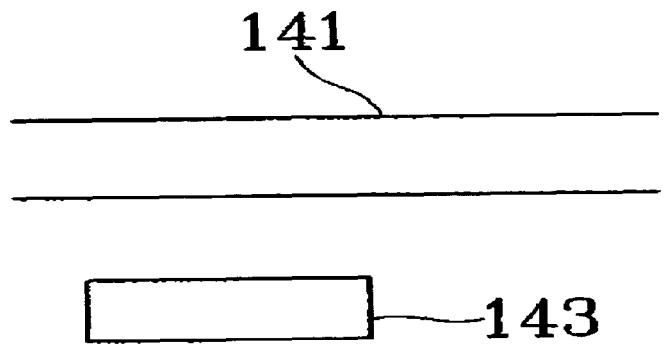
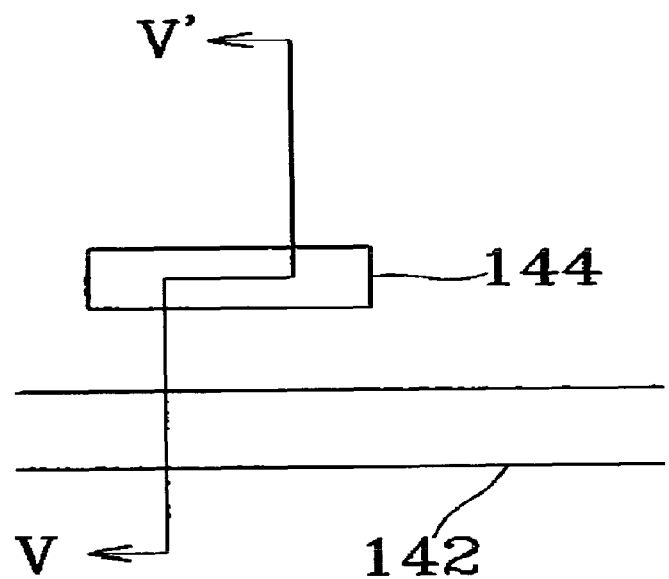
[Fig. 5]
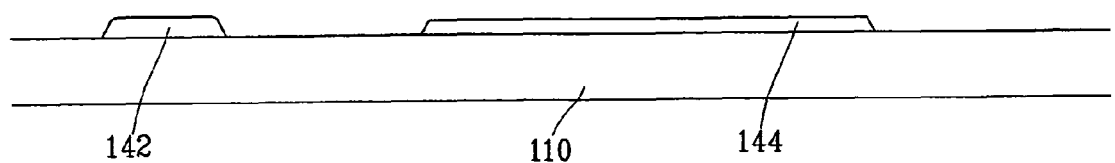

[Fig. 6]
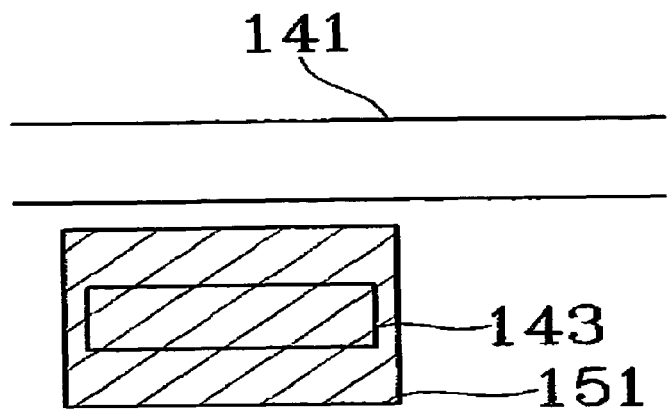
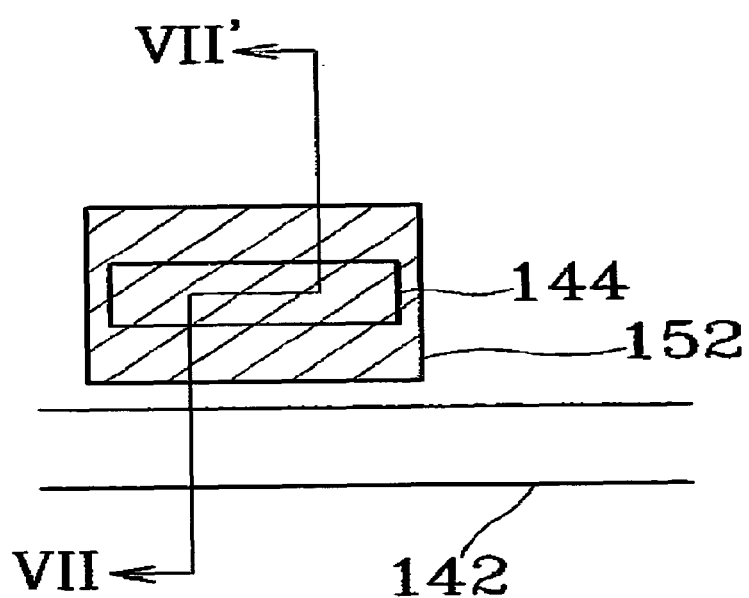
[Fig. 7]
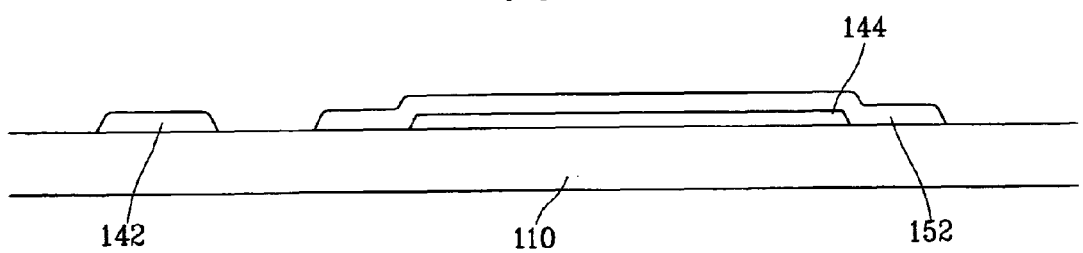

[Fig. 8]
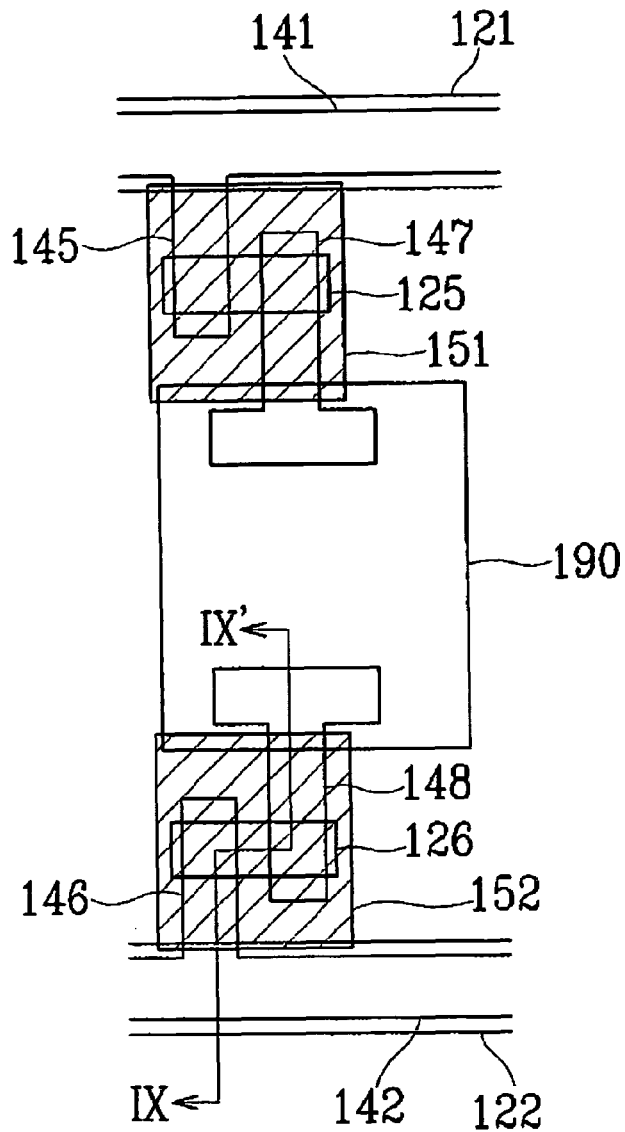
[Fig. 9]
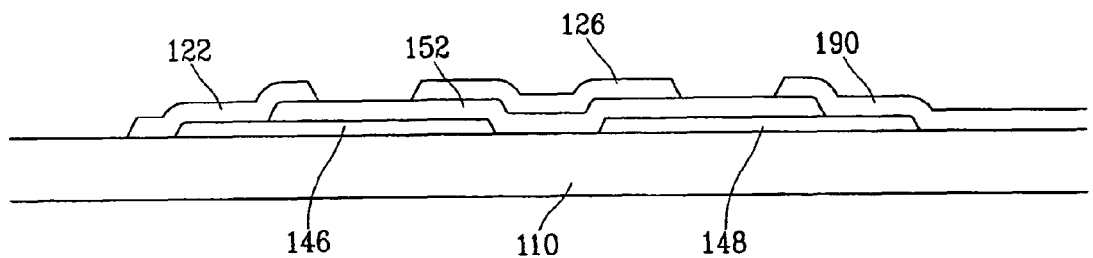

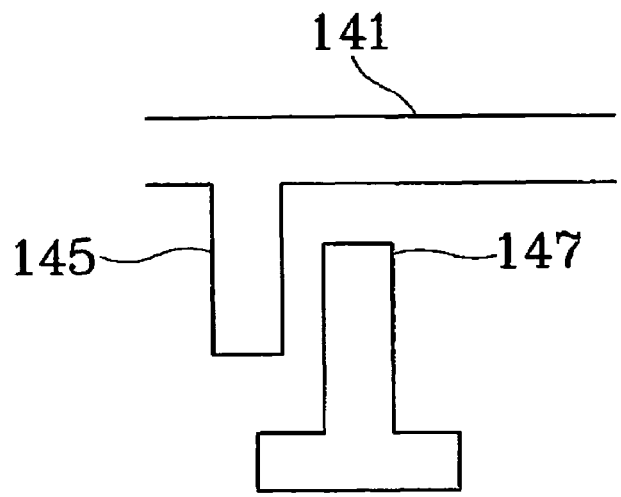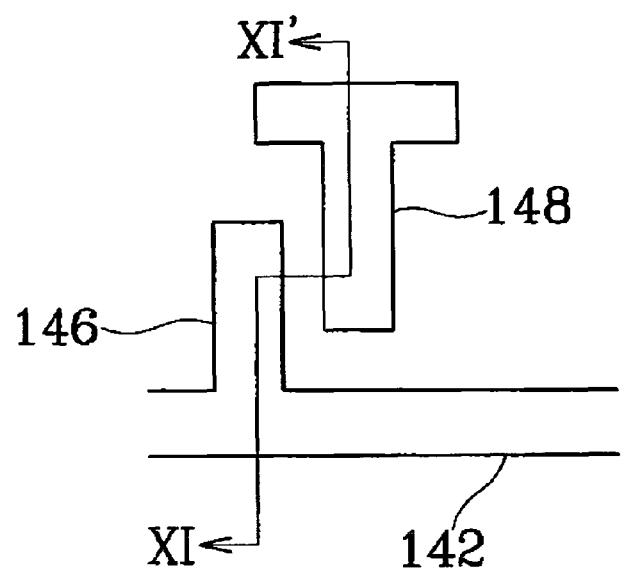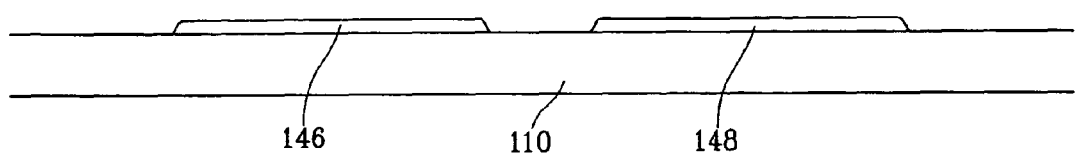

[Fig. 12]
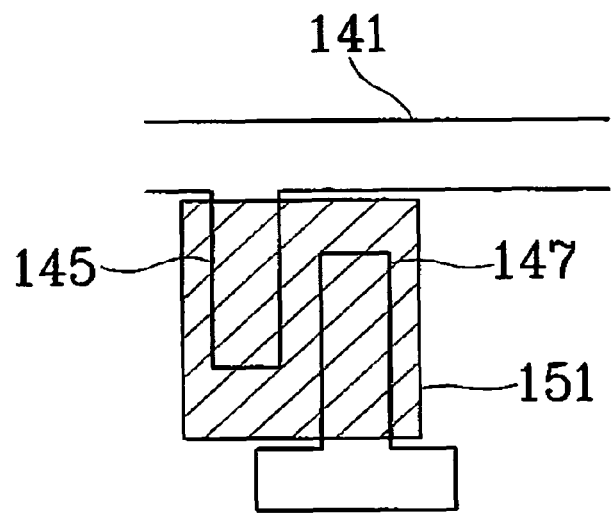
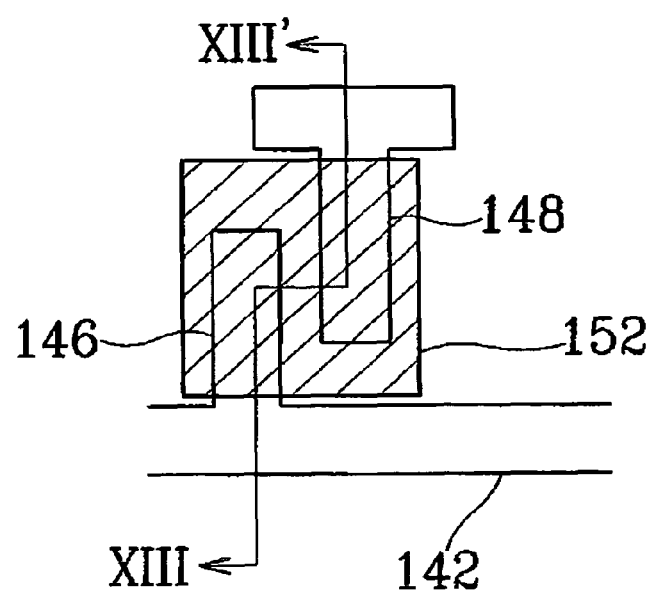
[Fig. 13]
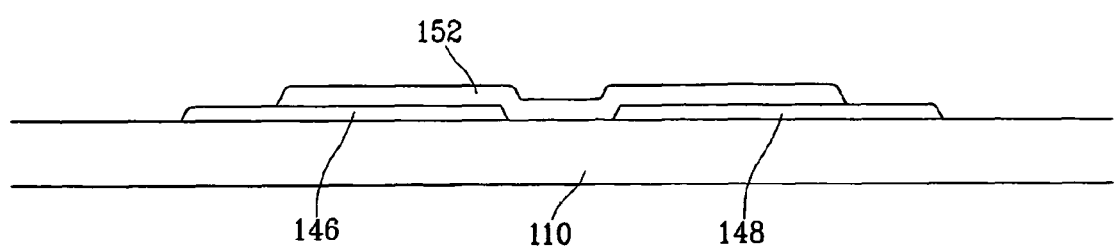

[Fig. 14]
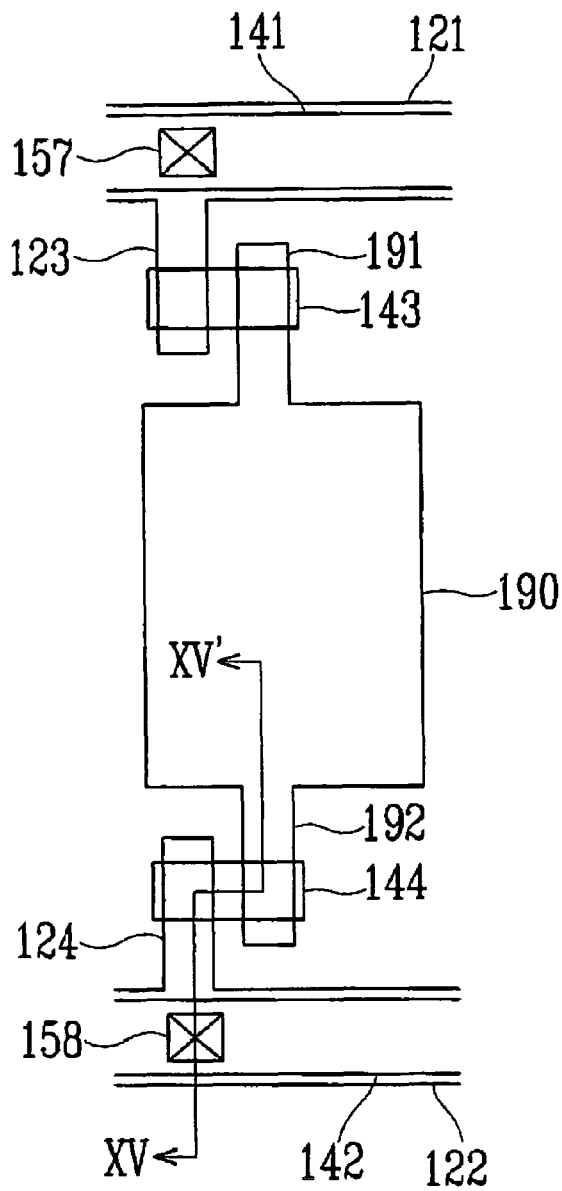
[Fig. 15]
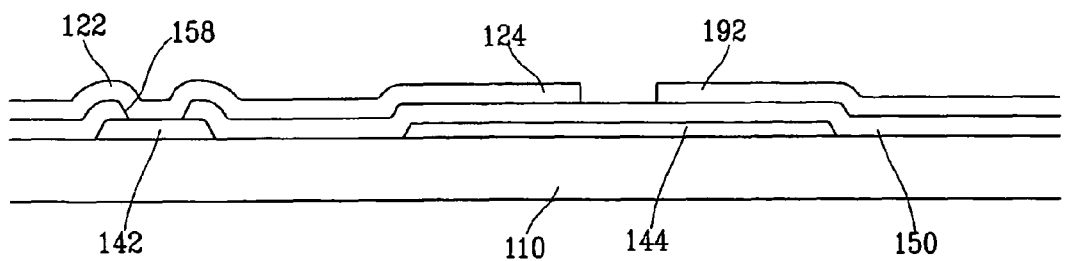

[Fig. 16]
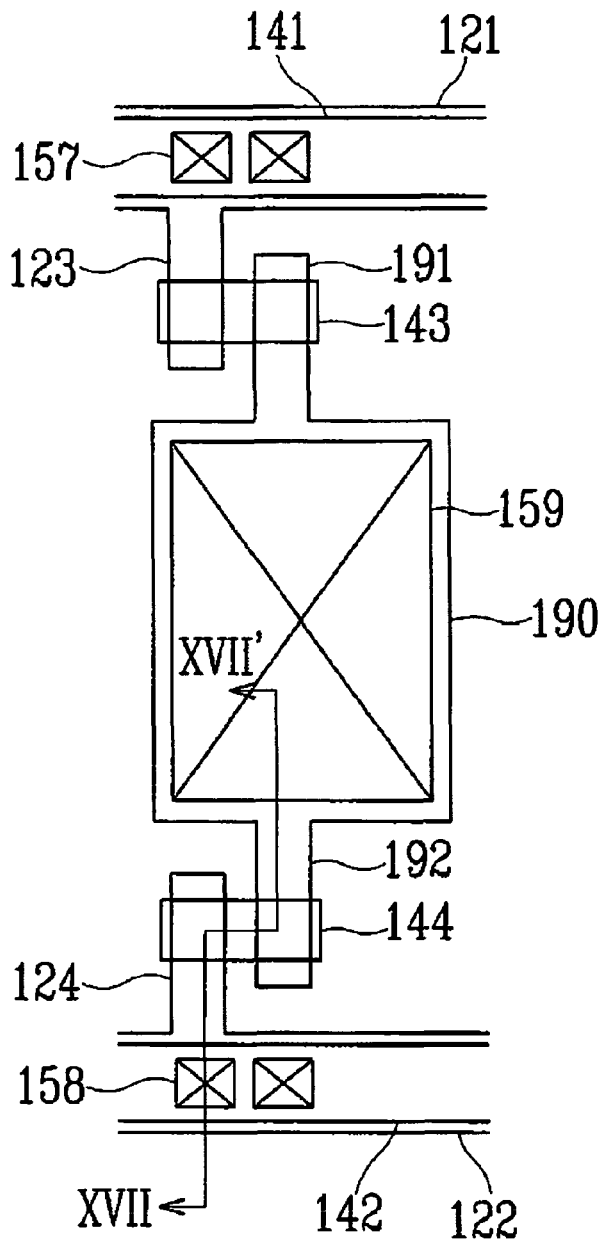
[Fig. 17]
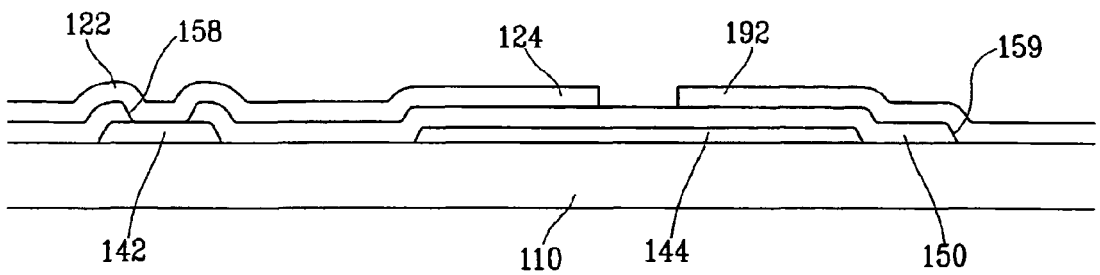

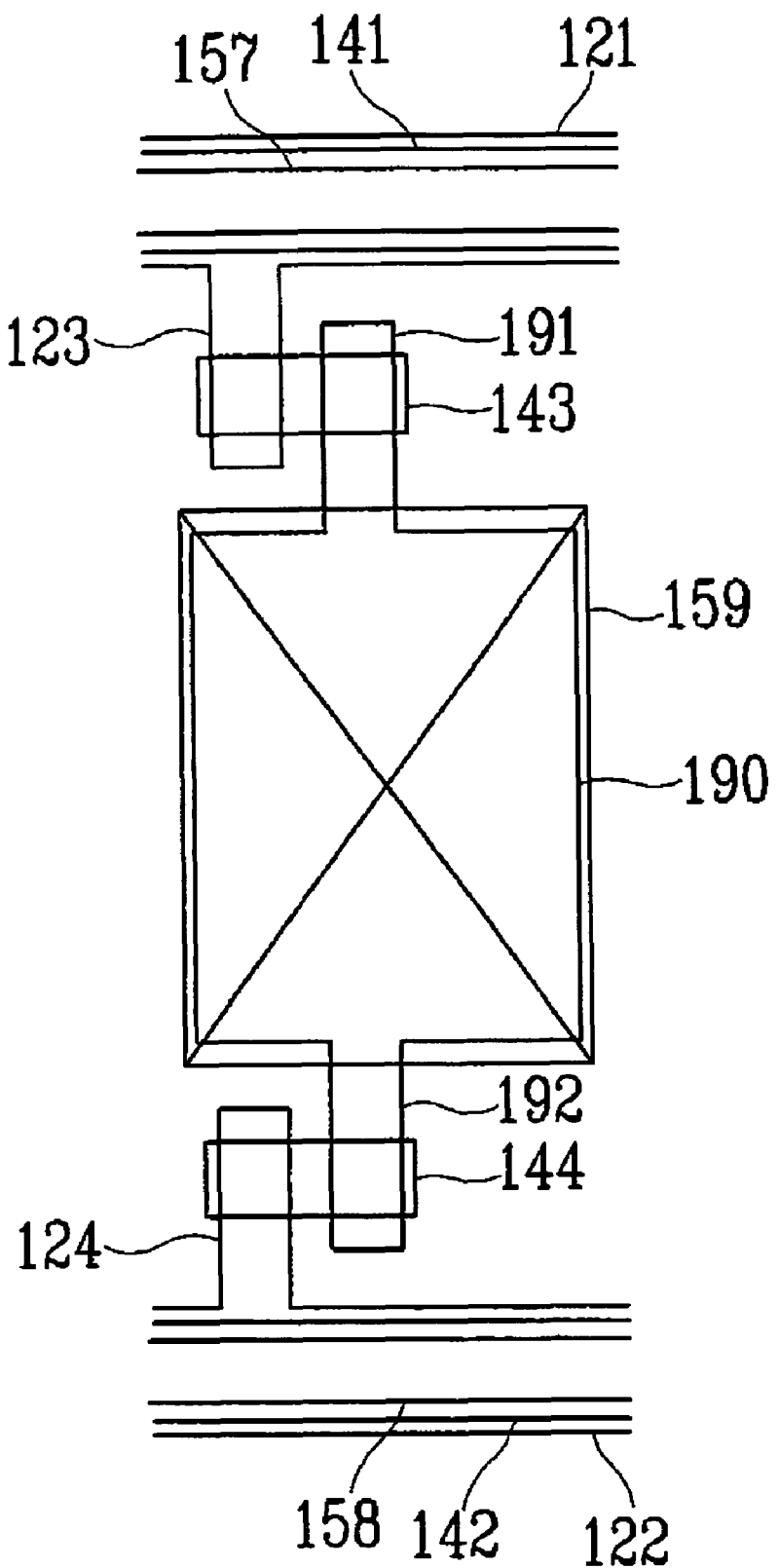
[Fig. 18]

[Fig. 19]
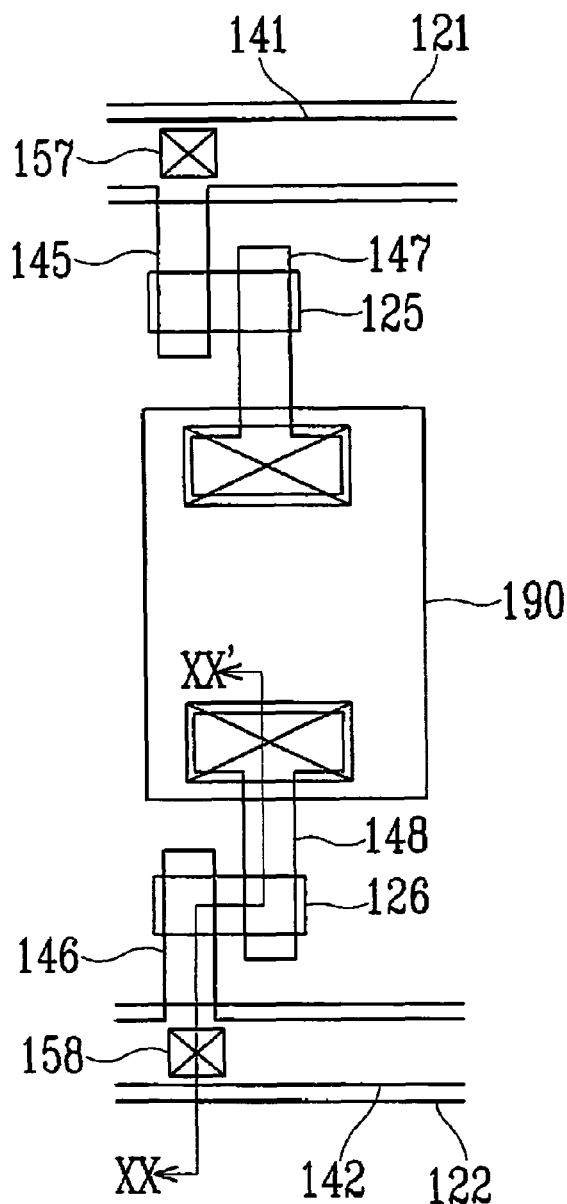
[Fig. 20]
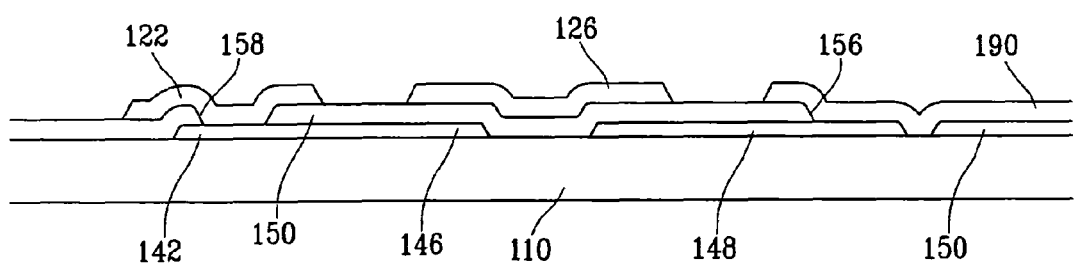

[Fig. 21]
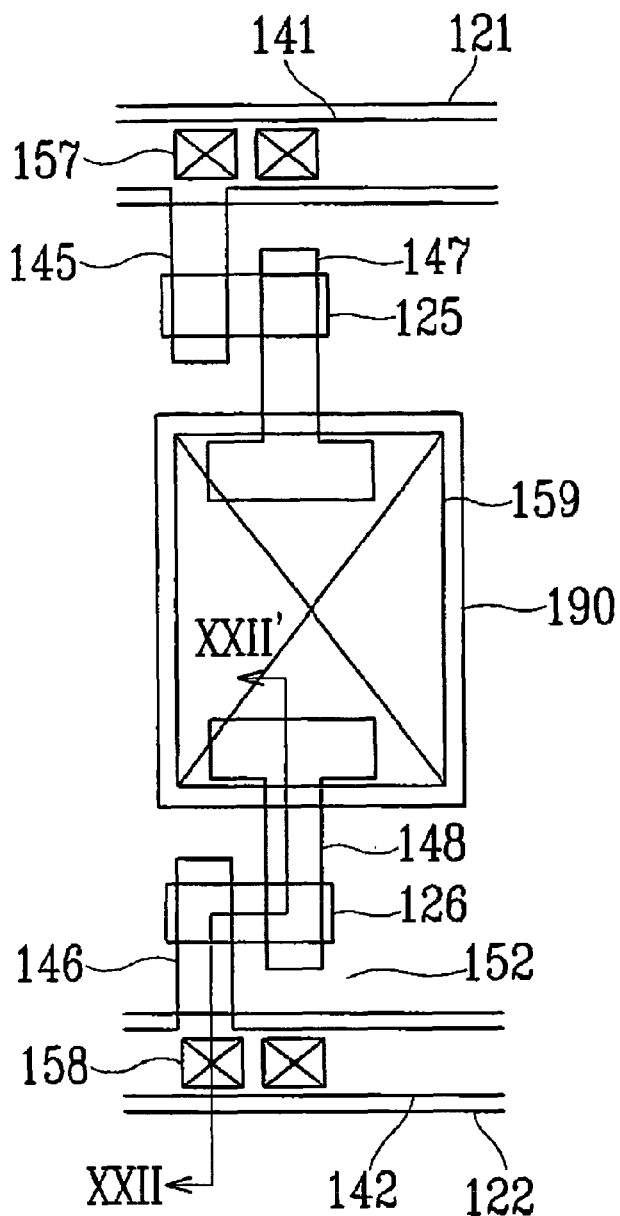
[Fig. 22]
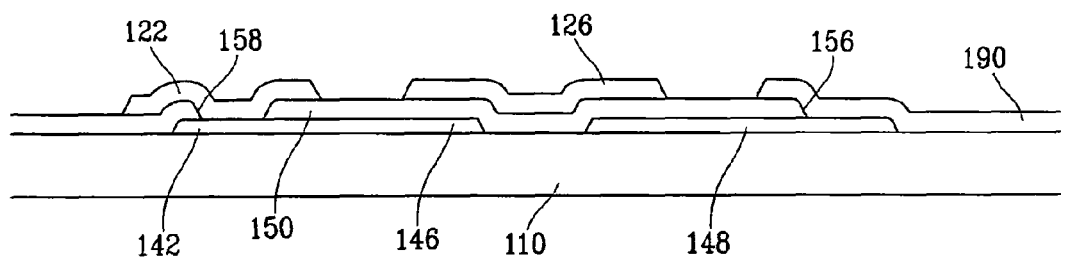

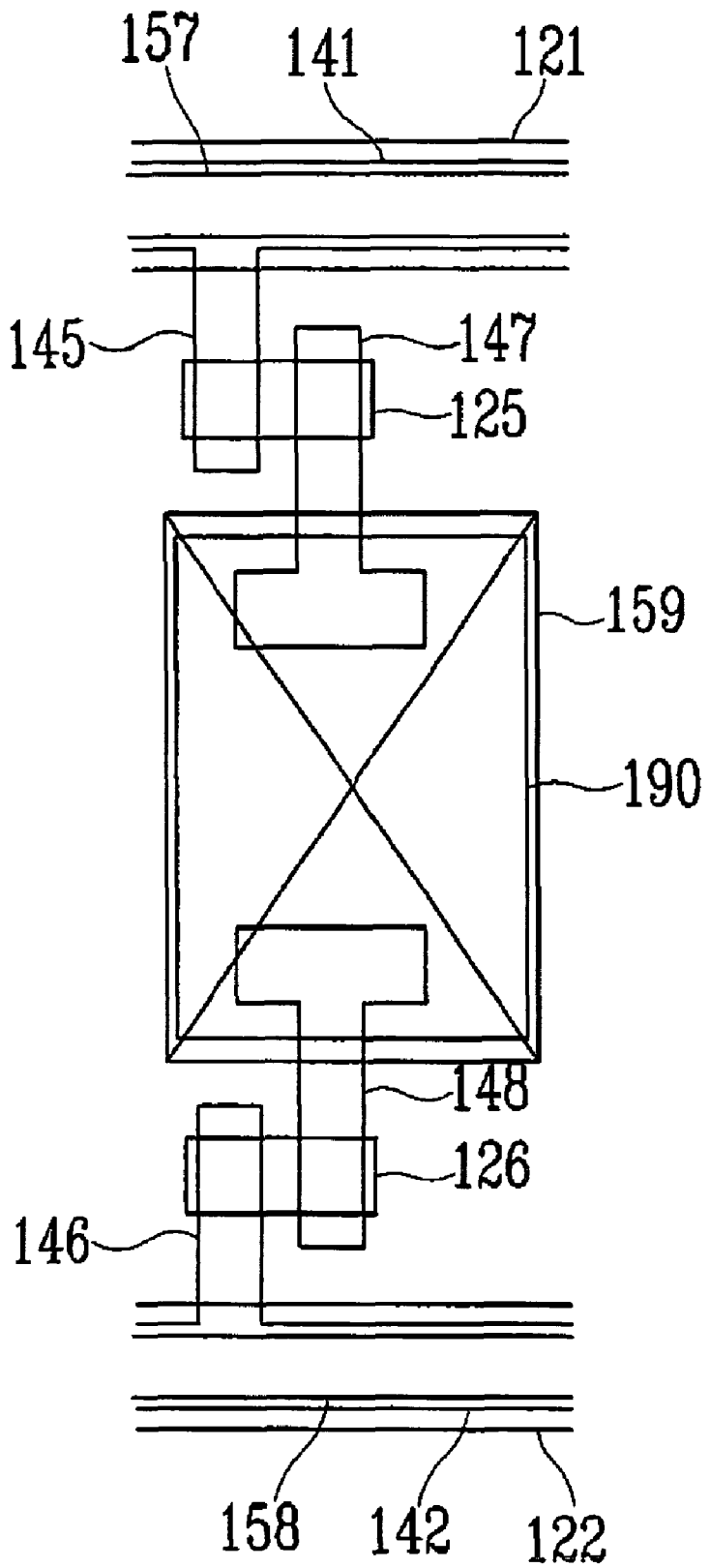
[Fig. 23]

THIN FILM DIODE PANEL AND MANUFACTURING METHOD OF THE SAME

TECHNICAL FIELD

The present disclosure relates to thin film diode array panels using metal insulator metal (MIM) diodes as switching elements, and a manufacturing method of the same. In more detail, the present disclosure relates to thin film diode array panels of a dual select diode (DSD) type, and a liquid crystal display using the same.

BACKGROUND ART

A liquid crystal display (LCD) is one of the most widely used flat panel displays. An LCD includes two panels provided with field-generating electrodes, and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

An LCD may have switching elements to switch voltages of pixels arranged in a matrix form. An LCD can display various images since pixel voltages are individually switched. An LCD having switching elements to switch pixel voltages individually is called an active matrix LCD.

Thin film transistors or thin film diodes may be used as the switching elements. When thin film diodes are applied, MIM diodes can be used.

A MIM diode has two metal layers and one insulating layer interposed between the metal layers, and a thickness capable of being measured in micrometers. A MIM diode may act as a switch due to electrical non-linearity of the insulating layer. A MIM diode has two terminals, and as a result, the manufacturing process of the MIM diode is simpler than that of the thin film transistor having three terminals. Accordingly, MIM diodes can be manufactured at a lower cost than thin film transistors.

However, when diodes are used as switching elements, the uniformity of image quality and contrast ratio may be degraded due to asymmetry of an applied voltage with respect to the polarity.

In response to the asymmetry, a dual select diode (DSD) panel has been developed. A DSD panel includes two diodes that are symmetrically connected to a pixel electrode and are driven by applying voltages of opposite polarities.

A DSD LCD shows improved image quality, contrast ratio, gray scale uniformity, and response speed by applying voltages having opposite polarities to two diodes that are connected to the same pixel electrode. Accordingly, a DSD type LCD can display images with high resolution like that of an LCD using thin film transistors.

A thin film diode array panel of a conventional DSD LCD has transmission electrodes made of a transparent conductor such as indium tin oxide (ITO) formed on a substrate as a bottom layer, and signal lines made of a metal and formed on the other layers as a top layer.

DISCLOSURE OF INVENTION

Technical Problem

Hence, such a conventional thin film diode array panel structure has demerits as follows.

It is difficult to manufacture the thin film diode array panel by using a mass production line for manufacturing a thin film transistor array panel.

There is a large possibility of having a signal line defect because metal signal lines which are chemically weak are exposed to a liquid crystal material and external environments.

Off current (Ioff) of a MIM diode is increased because back light reaches the silicone-rich silicon nitride (Si-rich SiNx) layer that forms a channel of the MIM diode, and activates the Si-rich SiNx layer. To solve such a problem, the back light unit is disposed on the color filter panel side and displayed images are seen in front of the thin film diode panel. However, this method also has problems such that characteristics of MIM diodes are affected by external light, and the contrast ratio is degraded due to light reflections by the metal signal lines.

Technical Solution

The present invention provides a thin film diode array panel comprising: an insulating substrate; first and second redundant gate lines made of an opaque conductor and formed on the insulating substrate; first and second floating electrodes made of an opaque conductor, formed on the insulating substrate and disposed between the first and second redundant gate lines; an insulating layer formed on the first and second floating electrodes; a first gate line formed on the first redundant gate line and including a first input electrode overlapping the first floating electrode where the insulating layer is interposed between the first input electrode and the first floating electrode; a second gate line formed on the second redundant gate line and including a second input electrode overlapping the second floating electrode where the insulating layer is interposed between the second input electrode and the second floating electrode; and a pixel electrode including a first contact electrode overlapping the first floating electrode where the insulating layer is interposed between the first contact electrode and the first floating electrode, a second contact electrode overlapping the second floating electrode where the insulating layer is interposed between the second contact electrode and the second floating electrode, and a main body.

Here, the first and second redundant gate lines and the first and second floating electrodes may be made of Mo, and the pixel electrode and the first and second gate lines may be made of ITO. The insulating layer may include a first insulating layer regionally formed and the first floating electrode, and a second insulating layer regionally formed around the second floating electrode. The insulating layer may cover the first and second redundant gate lines and the first and second floating electrodes and may have contact holes exposing the first and second redundant gate lines, and the first and second gate lines may be connected to the first and second redundant gate lines through the contact holes. The insulating layer may cover the first and second redundant gate lines and the first and second floating electrodes and may have cutout stripes exposing the first and second redundant gate lines, and the first and second gate lines may be connected to the first and second redundant gate lines through the cutout stripes. The insulating layer may have a cutout disposed to overlap at least a portion of the main body of the pixel electrode. The cutout may be disposed under the main body of the pixel electrode and expose a portion of the insulating substrate around the main body of the pixel electrode.

A thin film diode array panel comprising: an insulating substrate; first redundant gate lines including a first input electrode and made of an opaque conductor; second redundant gate lines including a second input electrode and made of an opaque conductor; first and second contact electrodes formed on the insulating substrate and made of an opaque conductor; an insulating layer formed on the first and second input electrodes and the first and second contact electrodes; a first gate line formed on the first redundant gate line; a second gate line formed on the second redundant gate line; a first floating electrode formed on the insulating layer and overlapping the first input electrode and the first contact electrode; a second floating electrode formed on the insulating layer and overlapping the second input electrode and the second contact electrode; and a pixel electrode connected to the first and second contact electrodes, is provided.

The first and second redundant gate lines and the first and second contact electrodes may be made of Mo, and the pixel electrode and the first and second gate lines may be made of ITO. The insulating layer may include a first insulating layer regionally formed around the first floating electrode, and a second insulating layer regionally formed around the second floating electrode. The insulating layer may cover the first and second redundant gate lines and the first and second contact electrodes and may have contact holes exposing the first and second redundant gate lines, and the first and second gate lines may be connected to the first and second redundant gate lines through the contact holes. The insulating layer may cover the first and second redundant gate lines and the first and second contact electrodes and may have cutout stripes exposing the first and second redundant gate lines, and the first and second gate lines may be connected to the first and second redundant gate lines thrush the cutout stripes. The insulating layer may have a cutout disposed to overlap at least a portion of the main body of the pixel electrode. The cutout is disposed under the main body of the pixel electrode, and exposes a portion of the insulating substrate around the main body of the pixel electrode.

Advantageous Effects

According to the present invention, since signal lines made of a chemically weak metal are covered and protected by an insulating layer and transparent electrode, the possibility of signal line defects is diminished. Since a metal layer intercepts light, even though a back light is disposed under the thin film diode panel, off current (Ioff) of the MIM diodes is not increased.

BRIEF DESCRIPTION OF THE DRAWINGS

Preferred embodiments of the present invention can be understood in more detail from the following descriptions taken in conjunction with the accompanying drawings, in which:

FIG. 1 is a perspective view of a liquid crystal display according to an embodiment of the present invention;

FIG. 2 is a layout view of a thin film diode array panel for a liquid crystal display according to an embodiment of the present invention;

FIG. 3 is a sectional view of the thin film diode array panel taken along the line III-III of FIG. 2;

FIG. 4 is a layout view of a thin film diode array panel in an intermediate step of manufacturing the thin film diode array panel of FIGS. 2 and 3;

FIG. 5 is a sectional view of the thin film diode array panel shown in FIG. 4 taken along the line V-V FIG. 6 is a layout view of a thin film diode array panel in the next step of FIGS. 4 and 5 of manufacturing the thin film diode array panel of FIGS. 2 and 3;

FIG. 7 is a sectional view of the thin film diode array panel shown in FIG. 6 taken along the line VII-VII FIG. 8 is a layout view of a thin film diode array panel for a liquid crystal display according to another embodiment of the present invention;

FIG. 9 is a sectional view of the thin film diode array panel taken along the line IX-IX of FIG. 8;

FIG. 10 is a layout view of a thin film diode array panel in an intermediate step of manufacturing the thin film diode array panel of FIGS. 8 and 9;

FIG. 11 is a sectional view of the thin film diode array panel shown in FIG. 10 taken along the line XI-XI FIG. 12 is a layout view of a thin film diode array panel in the next step of FIGS. 11 and 12 of manufacturing the thin film diode array panel of FIGS. 8 and 9;

FIG. 13 is a sectional view of the thin film diode array panel shown in FIG. 12 taken along the line XIII-XIII FIG. 14 is a layout view of a thin film diode array panel for a liquid crystal display according to another embodiment of the present invention;

FIG. 15 is a sectional view of the thin film diode array panel taken along the line XV-XV of FIG. 14;

FIG. 16 is a layout view of a thin film diode array panel for a liquid crystal display according to another embodiment of the present invention;

FIG. 17 is a sectional view of the thin film diode array panel taken along the line XVII-XVII of FIG. 16;

FIG. 18 is a layout view of a thin film diode array panel for a liquid crystal display according to another embodiment of the present invention;

FIG. 19 is a layout view of a thin film diode array panel for a liquid crystal display according to another embodiment of the present invention;

FIG. 20 is a sectional view of the thin film diode array panel taken along the line XX-XX of FIG. 19;

FIG. 21 is a layout view of a thin film diode array panel for a liquid crystal display according to another embodiment of the present invention;

FIG. 22 is a sectional view of the thin film diode array panel taken along the line XXII-XXII of FIG. 21; and FIG. 23 is a layout view of a thin film diode array panel for a liquid crystal display according to another embodiment of the present invention.

BEST MODE FOR CARRYING OUT THE INVENTION

Preferred embodiments of the present invention now will be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

FIG. 1 is a perspective view of a liquid crystal display according to an embodiment of the present invention.

As shown in FIG. 1, the liquid crystal display has a lower panel (a thin film diode array panel) 100, an upper panel (a color filter array panel) 200 facing the lower panel 100, and a liquid crystal layer 3 interposed between the two panels 100 and 200 and having liquid crystal molecules aligned in a horizontal direction with respect to the surfaces of the panels 100 and 200.

The lower panel 100 has a plurality of pixel electrodes 190 formed on corresponding regions with red, green, and blue pixels; a plurality of pairs of gate lines 121 and 122 transmitting signals having opposite polarities; and a plurality of MIM diodes D1 and D2 which are switching elements.

The upper panel 200 includes a plurality of data electrode lines 230 forming an electric field along with the pixel electrode 190 for driving liquid crystal molecules and defining pixel regions by intersecting the pairs of gate lines 121 and 122, and a plurality of red, green, and blue color filters 220 which respectively correspond with pixel areas to define red, green, and blue pixel areas. White pixel areas on which no color filter is formed may be included.

Henceforth, a structure of a thin film diode array panel 100 according to an embodiment of the present invention will be described in detail.

FIG. 2 is a layout view of a thin film diode array panel for a liquid crystal display according to an embodiment of the present invention, and FIG. 3 is a sectional view of the thin film diode array panel taken along the line III-III of FIG. 2 according to an embodiment of the present invention.

As shown in FIGS. 2 and 3, first and second redundant gate lines 141 and 142 and first and second floating electrodes 143 and 144 are formed on an insulating substrate 110 made of a transparent insulating material such as glass. The first and second floating electrodes 143 and 144 are disposed between the first and second redundant gate lines 141 and 142. The first and second redundant gate lines 141 and 142 and first and second floating electrodes 143 and 144 are made of an opaque conductor such as molybdenum (Mo), aluminum (Al), tantalum (Ta), titanium (Ti), and their alloys.

First and second insulating layers 151 and 152 are respectively formed on the first and second floating electrodes 143 and 144. The first and second insulating layers 151 and 152 are made of silicon nitride (SiNx). The first and second insulating layers 151 and 152 have boundaries around the first and second floating electrodes 143 and 144.

A plurality of pixel electrodes 190 having first and second contact portions 191 and 192 and a plurality of first and second gate lines 121 and 122 respectively having first input electrodes 123 and second input electrodes 124 are formed on the first and second insulating layers 151 and 152. The pixel electrodes 190 and the first and second gate lines 121 and 122 are made of a transparent conductor such as ITO and IZO.

The main body of the pixel electrode 190 contacts the insulating substrate 110. The first contact portion 191 contacts the first insulating layer 151 and overlaps the first floating electrode 143. The second contact portion 192 contacts the second insulating layer 152 and overlaps the second floating electrode 144.

The first and second gate lines 121 and 122 respectively cover the first redundant gate lines 141 and the second redundant gate lines 142. The first input electrode 123 contacts the first insulating layer 151 and overlaps the first floating electrode 143. The second input electrode 124 contacts the second insulating layer 152 and overlaps the second floating electrode 144.

The input electrodes 123 and 124, the insulating layers 151 and 152, the floating electrodes 143 and 144, and the contact portions 191 and 192 form two MIM diodes.

Due to the nonlinearity of voltage-current characteristics of the insulating layer 151 and 152, the MIM diodes permit the pixel electrode 190 to be charged only when a voltage greater than the critical voltage of the insulating layers 151 and 152 is applied. On the contrary, when no signal voltage is applied to the MIM diodes, the charged voltage is preserved in a liquid crystal capacitor formed between the pixel electrode 190 and a data electrode line 230, since the channels of the MIM diodes are closed.

An LCD using a thin film diode array panel of FIGS. 2 and 3 has a wider aperture ratio than an LCD using TFTs to enhance brightness.

Since the floating electrodes 143 and 144 made of an opaque metal are disposed on the insulating substrate 110 as a bottom layer and the insulating layers 151 and 152 are formed on the floating electrodes 143 and 144, even though a back light is disposed under the thin film diode panel 100, the light of the back light does not reach the insulating layers 151 and 152 due to interception of the floating electrodes 143 and 144. As a result, off current (Ioff) of the MIM diodes is not increased.

Since the floating electrodes 143 and 144 and the first and second redundant gate lines 141 and 142 made of a chemically weak metal are covered and protected by the insulating layers 151 and 152 and the first and second gate lines 121 and 122, the possibility of signal line defects decreases.

Henceforth, a manufacturing method of a thin film diode array panel according to an embodiment of the present invention will be described.

FIG. 4 is layout view of a thin film diode array panel in an intermediate step of manufacturing the thin film diode array panel of FIGS. 2 and 3; FIG. 5 is a sectional view of the thin film diode array panel shown in FIG. 4 taken along the line V-V FIG. 6 is a layout view of a thin film diode array panel in the next step of FIGS. 4 and 5 of manufacturing the thin film diode array panel of FIGS. 2 and 3; and FIG. 7 is a sectional view of the thin film diode array panel shown in FIG. 6 taken along the line VII-VII As shown in FIGS. 4 and 5, a metal layer made of an opaque metal such as Mo, Al, Ta, Ti, and their alloys is deposited on the insulating substrate 110 and is photo-etched to form the first and second redundant gate lines 141 and 142 and first and second floating electrodes 143 and 144.

Next, a silicon nitride layer is deposited and is photo-etched to form the first insulating layer 151 on the first floating electrode 143 and to form the second insulating layer 152 on the second floating electrode 144.

Next, as shown in FIGS. 2 and 3, an ITO layer is deposited on the first and second insulating layers 151 and 152 and is photo-etched to form the pixel electrode 190 having the first and second contact portions 191 and 192 and the first and second gate lines 121 and 122 respectively including the first and second input electrodes 123 and 124.

Another embodiment of the present invention will now be described.

FIG. 8 is a layout view of a thin film diode array panel for a liquid crystal display according to another embodiment of the present invention, and FIG. 9 is a sectional view of the thin film diode array panel taken along the line IX-IX of FIG. 8.

As shown in FIGS. 8 and 9, first and second redundant gate lines 141 and 142 substantially extending in a transverse direction are formed on an insulating substrate 110 made of a transparent insulating material such as a glass. The first and second redundant gate lines 141 and 142 respectively include a plurality of first and second input electrodes 145 and 146 protruding in a longitudinal direction.

A first and second contact electrodes 147 and 148 having a shape of the character are formed on the insulating substrate 110. The first contact electrode 147 is adjacent to the first input electrode 145, and the second contact electrode 148 is adjacent to the second input electrode 146.

The first and second redundant gate lines 141 and 142, the first and second input electrodes 145 and 146, and the first and second contact electrodes 147 and 148 are made of an opaque conductor such as molybdenum (Mo), aluminum (Al), tantalum (Ta), titanium (Ti), and their alloys.

First and second insulating layers 151 and 152 are respectively formed on the first input electrode 145 and the first contact electrode 147 and on the second input electrode 146 and the second contact electrode 148. The first and second insulating layers 151 and 152 are made of silicon nitride (SiNx). The first and second insulating layers 151 and 152 have boundaries around the first input electrodes 145 and the first contact electrode 147 and around the second input electrode 146 and the second contact electrode 148.

First and second gate lines 121 and 122 and first and second floating electrodes 125 and 126 are formed on the first and second insulating layers 151 and 152. A pixel electrode 190 is formed on the first and second insulating layers 151 and 152 to contact with the exposed portion of the first and second contact electrodes 147 and 148.

The pixel electrodes 190, the first and second gate lines 121 and 122, and the first and second floating electrodes 125 and 126 are made of a transparent conductor such as an ITO and IZO.

The first floating electrode 125 overlaps the first input electrodes 145 and the first contact electrode 147. The second floating electrode 126 overlaps the second input electrode 146 and the second contact electrode 148.

The first and second gate lines 121 and 122 respectively cover the first redundant gate lines 141 and the second redundant gate lines 142.

The pixel electrode 190 mainly contacts the insulating substrate 110, covers the exposed portions of the first and second contact electrodes 147 and 148, and partially contacts the first and second insulating layer 151 and 152. Accordingly, the first and second contact electrodes 146 and 147 are covered and protected by the first and second insulating layers 151 and 152 and the pixel electrode 190.

The input electrodes 145 and 146, the insulating layers 151 and 152, the floating electrodes 125 and 126, and the contact electrodes 147 and 148 form two MIM diodes.

An LCD using a thin film diode array panel of FIGS. 8 and 9 has a wider aperture ratio than an LCD using TFTs to enhance brightness.

Since the input electrodes 145 and 146 made of an opaque metal are disposed on the insulating substrate 110 as a bottom layer and the insulating layers 151 and 152 are formed on the floating electrodes 143 and 144, even though a back light is disposed under the thin film diode panel 100, the light of the back light does not reach the insulating layers 151 and 152 die to interception of the input electrodes 145 and 146. As a result, off current (Ioff) of the MIM diodes is not increased Since the contact electrodes 147 and 148 and the redundant gate lines 141 and 142 made of a chemically weak metal are covered and protected by the insulating layer 151 and 152 and the first and second gate lines 121 and 122, the possibility of signal line defects decreases.

Hence, a manufacturing method of a thin film diode array panel according to an embodiment of the present invention will be described.

FIG. 10 is layout view of a thin film diode array panel in an intermediate step of manufacturing the thin film diode array panel of FIGS. 8 and 9; FIG. 11 is a sectional view of the thin film diode array panel shown in FIG. 10 taken along the line XI-XI FIG. 12 is a layout view of a thin film diode array panel in the next step of FIGS. 11 and 12 of manufacturing the thin film diode array panel of FIGS. 8 and 9; and FIG. 13 is a sectional view of the thin film diode array panel shown in FIG. 12 taken along the line XIII-XIII As shown in FIGS. 10 and 11, a metal layer made of an opaque metal such as Mo, Al, Ta, Ti, and their alloys is deposited on the insulating substrate 110, and is photo-etched to form the first and second redundant gate lines 141 and 142 and first and second contact electrodes 147 and 148.

Next, as shown in FIGS. 12 and 13, a silicon nitride layer is deposited and is photo-etched to form the first insulating layer 151 on the first input electrode 145 and the first contact electrode 147, and to form the second insulating layer 152 on the second input electrode 146 and the second contact electrode 148.

Next, as shown in FIGS. 8 and 9, an ITO layer is deposited on the first and second insulating layers 151 and 152 and is photo-etched to form the pixel electrode 190 and the first and second floating electrode 125 and 126.

In the above describe embodiment, the insulating layers are regionally disposed around the floating electrode. However, the shape of the insulating layers may be changed in various ways. Such variations will be described as other embodiments.

FIG. 14 is a layout view of a thin film diode array panel for a liquid crystal display according to another embodiment of the present invention, and FIG. 15 is a sectional view of the thin film diode array panel taken along the line XV-XV of FIG. 14.

When the thin film diode array panel of FIGS. 14 and 15 is compared with that of FIGS. 2 and 3, the shape of an insulating layer 150 is different.

That is, the insulating layer 150 is formed on the entire area of the insulating substrate 110 to cover the redundant gate lines 141 and 142 and floating electrodes 143 and 144, and has contact holes 157 and 158 exposing portions of the redundant gate lines 141 and 142. Accordingly, the gate lines 121 and 122 and the pixel electrode 190 are formed on the insulating layer 150, and the gate lines 121 and 122 are connected to the redundant gate lines 141 and 142 through the contact holes 157 and 158.

FIG. 16 is a layout view of a thin film diode array panel for a liquid crystal display according to another embodiment of the present invention, and FIG. 17 is a sectional view of the thin film diode array panel taken along the line XVII-XVII of FIG. 16.

When the thin film diode array panel of FIGS. 16 and 17 is compared with that of FIGS. 14 and 15, the shape of an insulating layer 150 is different.

In the thin film diode array panel of FIGS. 16 and 17, the insulating layer 150 has a cutout 159 disposed to overlap a portion of the pixel electrode 190 to enhance the light transmittance ratio.

Furthermore, the number of contact holes 157 and 158 exposing the redundant gate lines 141 and 142 is increased to enhance the electrical connection between the redundant gate lines 141 and 142 and the gate lines 121 and 122.

FIG. 18 is a layout view of a thin film diode array panel for a liquid crystal display according to another embodiment of the present invention.

When the thin film diode array panel of FIG. 18 is compared with that of FIGS. 14 and 15, the shape of an insulating layer 150 is different.

The insulating layer 150 has a cutout 159 disposed under the main body of the pixel electrode 190 and exposing a portion of the insulating substrate 110 around the main body of the pixel electrode 190 to enhance the light transmittance ratio.

The insulating layer 150 has cutout stripes 157 and 158 exposing the redundant gate lines 141 and 142 to enhance the electrical connection between the redundant gate lines 141 and 142 and the gate lines 121 and 122.

FIG. 19 is a layout view of a thin film diode array panel for a liquid crystal display according to another embodiment of the present invention, and FIG. 20 is a sectional view of the thin film diode array panel taken along the line XX-XX of FIG. 19.

When the thin film diode array panel of FIGS. 19 and 20 is compared with that of FIGS. 8 and 9, the shape of an insulating layer 150 is different.

That is, the insulating layer 150 is formed on the entire area of the insulating substrate 110 to cover the redundant gate lines 141 and 142 and contact electrodes 157 and 158. The insulating layer 150 has contact holes 157 and 158 exposing portions of the redundant gate lines 141 and 142, and contact holes 155 and 156 exposing a portion of the contact electrodes 147 and 148.

Accordingly, the gate lines 121 and 122 and the pixel electrode 190 are formed on the insulating layer 150. The gate lines 121 and 122 are connected to the redundant gate lines 141 and 142 thresh the contact holes 157 and 158, and the pixel electrode 190 is connected to the contact electrodes 147 and 148 through the contact holes 155 and 156.

FIG. 21 is a layout view of a thin film diode array panel for a liquid crystal display according to another embodiment of the present invention, and FIG. 22 is a sectional view of the thin film diode array panel taken along the line XXII-XXII of FIG. 21.

When the thin film diode array panel of FIGS. 21 and 22 is compared with that of FIGS. 19 and 20, the shape of an insulating layer 150 is different.

In the thin film diode array panel of FIGS. 21 and 22, the insulating layer 150 has a cutout 159 disposed to overlap a portion of the pixel electrode 190 to enhance the light transmittance ratio.

Furthermore, the number of contact holes 157 and 158 exposing the redundant gate lines 141 and 142 is increased to enhance the electrical connection between the redundant gate lines 141 and 142 and the gate lines 121 and 122.

FIG. 23 is a layout view of a thin film diode array panel for a liquid crystal display according to another embodiment of the present invention.

When the thin film diode array panel of FIG. 23 is compared with that of FIGS. 19 and 20, the shape of an insulating layer 150 is different.

The insulating layer 150 has a cutout 159 disposed under the main body of the pixel electrode 190 and exposes a portion of the insulating substrate 110 around the main body of the pixel electrode 190 to enhance the light transmittance ratio.

The insulating layer 150 has cutout stripes 157 and 158 exposing the redundant gate lines 141 and 142 to enhance the electrical connection between the redundant gate lines 141 and 142 and the gate lines 121 and 122.

Although the illustrative embodiments have been described herein with reference to the accompanying drawings, it is to be understood that the present disclosure of invention is not limited to those precise embodiments, and that in light of the foregoing, various changes and modifications may be affected therein by one of ordinary skill in the related art without departing from the scope or spirit of the present teachings. All such changes and modifications are intended to be included within the scope of the present teachings.

The invention claimed is:

1. A thin film diode array panel comprising:
    an insulating substrate;
    first and second redundant gate lines made of an opaque conductor and formed on the insulating substrate;
    first and second floating electrodes made of an opaque conductor, formed on the insulating substrate, and disposed between the first and second redundant gate lines;
    an insulating layer formed on the first and second floating electrodes;
    a first gate line formed at least partially directly on the first redundant gate line and including a first input electrode overlapping the first floating electrode wherein the insulating layer is interposed between the first input electrode and the first floating electrode, and further wherein the insulating layer entirely covers lateral surfaces of the first floating electrode;
    a second gate line formed at least partially directly on the second redundant gate line and including a second input electrode overlapping the second floating electrode wherein the insulating layer is interposed between the second input electrode and the second floating electrode and further wherein the insulating layer entirely covers lateral surfaces of the second floating electrode; and
    a pixel electrode including a first contact electrode overlapping the first floating electrode where the insulating layer is interposed between the first contact electrode and the first floating electrode, a second contact electrode overlapping the second floating electrode where the insulating layer is interposed between the second contact electrode and the second floating electrode, and a main body.

2. The thin film diode array panel of claim 1, wherein the first and second redundant gate lines and the first and second floating electrodes are made of Mo, and the pixel electrode and the first and second gate lines are made of indium tin oxide (ITO).

3. The thin film diode array panel of claim 1, wherein the insulating layer includes a first insulating layer regionally formed around the first floating electrode, and a second insulating layer regionally formed around the second floating electrode.

4. The thin film diode array panel of claim 1, wherein the insulating layer covers the first and second redundant gate lines and the first and second floating electrodes and has contact holes exposing the first and second redundant gate lines, and the first and second gate lines are connected to the first and second redundant gate lines through the contact holes.

5. The thin film diode array panel of claim 4, wherein the insulating layer has a cutout disposed to overlap at least a portion of the main body of the pixel electrode.

6. The thin film diode array panel of claim 5, wherein the cutout is disposed under the main body of the pixel electrode and exposes a portion of the insulating substrate around the main body of the pixel electrode.

7. The thin film diode array panel of claim 1, wherein the insulating layer covers the first and second redundant gate lines and the first and second floating electrodes and has cutout stripes exposing the first and second redundant gate lines, and the first and second gate lines are connected to the first and second redundant gate lines through the cutout stripes.

8. A thin film diode array panel comprising:
    an insulating substrate ;
    first redundant gate lines including a first input electrode and made of an opaque conductor;
    second redundant gate lines including a second input electrode and made of an opaque conductor;
    first and second contact electrodes formed on the insulating substrate and made of an opaque conductor;
    an insulating layer formed on the first and second input electrodes and the first and second contact electrodes;
    a first gate line formed at least partially directly on the first redundant gate line;
    a second gate line formed at least partially directly on the second redundant gate line;
    a first floating electrode formed on the insulating layer and overlapping the first input electrode and the first contact electrode;

a second floating electrode formed on the insulating layer and overlapping the second input electrode and the second contact electrode;

and a pixel electrode connected to the first and second contact electrodes.

9. The thin film diode array panel of claim 8, wherein the first and second redundant gate lines and the first and second contact electrodes are made of Mo, and the pixel electrode and the first and second gate lines are made of indium tin oxide (ITO).

10. The thin film diode array panel of claim 8, wherein the insulating layer includes a first insulating layer regionally formed around the first floating electrode and a second insulating layer regionally formed around the second floating electrode.

11. The thin film diode array panel of claim 8, wherein the insulating layer covers the first and second redundant gate lines and the first and second contact electrodes and has contact holes exposing the first and second redundant gate lines, and the first and second gate lines are connected to the first and second redundant gate lines through the contact holes.

12. The thin film diode array panel of claim 11, wherein the insulating layer has a cutout disposed to overlap at least a portion of the main body of the pixel electrode.

13. The thin film diode array panel of claim 12, wherein the cutout is disposed under the main body of the pixel electrode and exposes a portion of the insulating substrate around the main body of the pixel electrode.

14. The thin film diode array panel of claim 8, wherein the insulating layer covers the first and second redundant gate lines and the first and second contact electrodes and has cutout stripes exposing the first and second redundant gate lines, and the first and second gate lines are connected to the first and second redundant gate lines through the cutout stripes.

* * * * *